G. WESTINGHOUSE.
FLUID PRESSURE DEVICE.
APPLICATION FILED SEPT. 12, 1910. RENEWED SEPT. 12, 1913.

1,089,517.

Patented Mar. 10, 1914.

WITNESSES:
Chas. F. Clagett
H. C. Tener

INVENTOR
Geo. Westinghouse
BY
L. C. Allan ATTORNEY

G. WESTINGHOUSE.
FLUID PRESSURE DEVICE.
APPLICATION FILED SEPT. 12, 1910. RENEWED SEPT. 12, 1913.

1,089,517.

Patented Mar. 10, 1914.
3 SHEETS—SHEET 3.

UNITED STATES PATENT OFFICE.

GEORGE WESTINGHOUSE, OF PITTSBURGH, PENNSYLVANIA, ASSIGNOR TO THE WESTINGHOUSE AIR SPRING COMPANY, A CORPORATION OF PENNSYLVANIA.

FLUID-PRESSURE DEVICE.

1,089,517.

Specification of Letters Patent.

Patented Mar. 10, 1914.

Application filed September 12, 1910, Serial No. 581,607. Renewed September 12, 1913. Serial No. 789,542.

*To all whom it may concern:*

Be it known that I, GEORGE WESTINGHOUSE, a citizen of the United States, and resident of Pittsburgh, in the county of Allegheny and State of Pennsylvania, have invented certain new and useful Improvements in Fluid-Pressure Devices, of which the following is a specification.

My present invention relates to hydropneumatic devices of the type set forth in my prior application, Serial No. 520,039, filed September 28, 1909.

In the present case as in the former, the invention is embodied in a cushion device adapted for use as a spring, which may be used in any relation where two bodies are so associated that resilient movement is desirable, and the general object in view in both cases has been to embody the principles of resilient support by an elastic cushion medium such as air, or gas in a practical, self-contained, gastight cushion device adapted either to serve all of the purposes of the steel springs commonly used, or to be used in conjunction therewith and to combine all of the desirable features of a shock absorber, without including the undesirable features.

My present invention also resembles that of my said prior application in so much as a fluid tight joint between sliding surfaces is obtained by means of a cylindrical leather packing tightly clamped in one of the sliding members, having its free edge presented in the direction of the high pressure and yieldingly forced into engagement with the other wall of the sliding joint by means of a rigid cone, spring pressed in a direction parallel with the axis of the device.

It also involves the use of a collecting space for oil which may find its way through the leather packing, and of an internal pump operated by a flow of fluid within the device for pumping the escaping oil back into the interior, thereby maintaining substantially constant the total amount of fluid medium within the device.

According to my present invention, however, all of the above mentioned parts are specifically new as to form, location, and relative arrangement.

Notable features of the invention are the location of the leather packing upon the interior of the external cylinder instead of upon the exterior of the internal cylinder; arranging the oil collecting space between the outside of the interior cylinder and inside of a guard cylinder concentric therewith, mounting the pump inlet valves and pump operating disk upon the base of the device at the bottom of the compression space; and arranging a supplemental displacing piston and suitable longitudinal partition cylinders in such manner as to cause the liquid displaced by such piston to flow to and fro between inner and outer compartments through openings arranged at the bottom thereof so that the liquid is brought into efficient operative relation to the pump operating disk. By this arrangement, the packing is always bathed in oil or other liquid, the space where escaping oil collects is part of a supplemental compression space at the base of the cylinder, the pump valves and operating disk are at all times in the lowermost and normally densest part of the liquid, and by reason of the rearrangement, the entire spring may be shortened several inches without decreasing the total possible expansion and compression thereof when in use.

The device is further shortened by employment of ball and socket mountings of which the sockets are cast into the cylinder heads.

The foregoing and other novel features of construction and operation of my invention will be more fully evident from the following detailed description in connection with the accompanying drawings in which—

By reference to the drawing in which like reference numerals represent like parts, it will be seen that in all forms of the device the main compression space is included within upper and lower cylinder heads 1 and 2, respectively, an upper outer main cylinder 3, a lower inner main cylinder 4, and a main packing 5 for the sliding joint between said cylinders. The various other cylinders shown differently in the different views are supplemental to said main cylinders and serve several functions which will be explained hereinafter.

The upper cylinder head 1 is a casting having formed centrally of the upper side thereof, the hemispherical socket 6, for the ball 7, which is held therein by a removable hemispherical nut 8. The ball is formed with a screw shank 9 and a hexagonal portion 10 whereby it may be screwed into the frame of the vehicle body to be supported or into suitable fixtures secured to the frame. An oil duct 11, extends through the screw shank and spherical head to permit passage of oil for lubricating the ball and socket. The lower surface of the head 1 is formed with suitable threaded surfaces upon which the upper cylinders are screwed.

The lower cylinder head 2 is externally somewhat similar to the upper head, and is provided with a ball and socket joint similar to that described above. The upper portion thereof is provided with suitable threaded surfaces for reception of the lower cylinders and with suitable recesses for reception of the various parts of the pump, for passage of the oil pumped thereby, and for the reception of the charging valves through which oil and compressed air are charged into the cylinder.

The upper main cylinder 3 is arranged outside of the lower main cylinder 4 which telescopes therewith, so that the main packing is outside of the lower cylinder and any oil which escapes through the sliding joint is carried downward by gravity and a collecting space 12 for such oil is closed in by an annular extension 13 of the lower head 2 and a supplemental outer cylinder 14 which has sliding engagement with and accurately fits the outer surface of the upper main cylinder 3. The cylinder 14 is preferably of a height approximately equal to the full stroke of the device so that the annular space 12 forms not only a dust-tight oil collecting space, but also serves as a supplemental compression space in which the air, though normally at atmospheric pressure, is nevertheless highly compressed in case of very sudden or extreme compression movements which do not afford opportunity for the escape of air through the sliding joint between the upper main cylinder 3 and said cylinder 14. In such cases the pressure in the space 12 affords an important auxiliary support to that afforded by the interior main compression space, and may also assist in forcing the collected oil through the intake of the internal pump.

The pump referred to is of the type intended to be operated by the to and fro flow of fluid within the device attendant upon the extension and compression movements of the main cylinders, but being mounted upon the base 2 near the bottom of the lower main cylinder 4, it is necessary to provide auxiliary means for displacing the fluid and causing it to flow in operative relation to the pump. This is accomplished by arranging the operating mechanism of the latter in a constricted passage, through which the fluid is caused to flow by the relative movements of the parts. As a means for accomplishing this, I sub-divide the main compression space into two compartments 15, 16 and provide a displacing head or piston 17 adapted to force flow of the fluid back and forth between the two compartments upon any relative movement for expansion and compression. The two compartments are formed preferably of cylinder 18 secured to head 1, and cylinder 19 secured to head 2. These cylinders are preferably of such size that the compartment 15 has approximately the same cross-section as the compartment 16, and one of the cylinders as 18, carries the displacing head 17 which is shown as screw threaded thereon, and as provided with an upper shoulder 20 adapted to engage with a screw collar 21 on main cylinder 4, thereby affording a stop to prevent disengagement of the parts upon extreme expansion movements of the device. The piston 17 need not fit the annular space 16 and as shown in the drawing, preferably affords considerable leakage space.

The cylinder 19 is secured to an annular casting 22 in which are arranged ports 23 for passage of the fluid to and fro between compartments 15 and 16. Other passages 24 in the upper end of the main lower cylinder 4 and passages 25 in the upper end of partition cylinder 18 permit sufficient flow of fluid to and from to the upper end of compartment 15 so as to insure efficient circulation thereof under the action of the displacing head 17 without undue constriction or development of excessive pressure at such points.

It will be noted that the casting 22 referred to has the general form of two concentric cylinders provided with the transverse walled passages 23 as above described, and also with vertically disposed annular passages 26 adapted to communicate with the charging inlet passage 27 at the lower end and with an annular space 28 formed by arranging an inner cylinder 29 concentric with the cylinder 19. These cylinders 19 and 29 are secured to the outer and inner walls of casting 22, preferably by brazing. Internally the casting 22 is formed with an annular inward projection 30 forming a constricted passage 31 in which plays the operating disk 32 of the pump rod 33. Said disk is free to slide between check nut 34, secured to said rod by pin 35, and a collar 36 abutting against shoulder 37.

Figure 1:
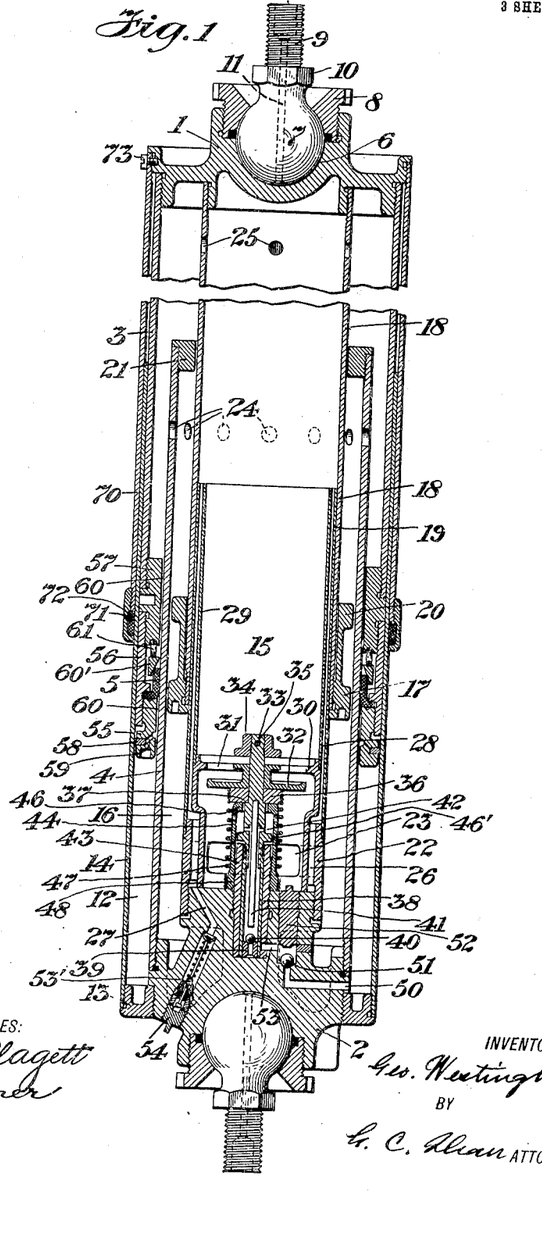
Figure 1 is a vertical central section showing one form of my invention.

In the form shown in Fig. 1, the pump rod 33 is integral with the hollow piston 38 fitted at the bottom with a perforated plug 39 carrying a ball valve 40, which is limited in its upper movement by a stop rod 41. The hollow piston is provided with outlet openings 42. It is fitted into a barrel or cylinder 43 screw threaded into the base 2, and upon the exterior of said barrel is screw threaded a cage 44 provided with upper shoulders 46 adapted to form a stop limiting the upward stroke of the pump by reason of contact therewith of flange 46'. This cage also serves as a guide for a tension spring 47, screw threaded and soldered to collar 36 and to the base 48 of said cage 44.

The intake of the pump consists of a passage 50 leading from the lower portion of collecting space 12 to a ball valve 51 limited in its upward movement by screw plug 52. From above the ball 51 leads a transverse passage 53 opening into the pump barrel at a point above the end of the piston when at the lower end of its stroke. With this arrangement, compression movement of the device causes the displacing head or piston 17 to force fluid flow through passages 23 and up into operative engagement with disk 32. The disk is forced upward by the pressure of the fluid until the upper portion comes in contact with the check nut 34. At this instant the disk has moved upwardly a sufficient distance to greatly decrease the annular outlet through constriction 31 and hence, the full fluid pressure is available to force the upward suction stroke of the pump piston. During this stroke the valve 40 remains seated and the valve 51 opens thereby applying the suction of the pump to any liquid which may have collected in the lower portion of collecting space 12. This oil being drawn above the valve 51, the reverse movement of the device and of the displacing head 17 causes reverse movement of the fluid and of the disk 32, and through it of the piston. During this movement, the valve 51 is closed and the valve 40 opens thereby permitting liquid drawn into the pump cavity to be displaced into the interior of the hollow piston. The cavity in the latter becomes filled during successive strokes and the oil thus pumped eventually finds its way outward through the piston outlets 42 into the compression space within the device.

The spring 47 assists the down stroke of the piston and tends to maintain the latter normally in the lowermost position where it covers and cuts off the inlet passage 53 thereby preventing reverse movement and escape of fluid from the interior in addition to the security already afforded by valves 40 and 51.

It will be noted that the suction stroke of the pump is caused by the compression movements of the device and that the expelling movements whereby the fluid is forced into the piston cavity is caused by the expansion movements of the device. Hence the rise of pressure in space 12 coöperates with the suction of the pump to force the liquid through the intake passage leading to the pump.

In Fig. 1, the inlet passage 27, through which the liquid and compressed air are charged into the device is closed by a suitable inlet valve 53' which is conventionally indicated in the drawings as of the type now commonly used on pneumatic tires, a screwed plug 54 being applied over the latter as an additional closure.

The main packing 5 between the main cylinders 3 and 4 is preferably carried by upper outer main cylinder 3 and consists of a cylinder of heavy leather like a cup leather except that the annular securing flange is turned outwardly. The cylindrical portion of the leather has an extended bearing upon the exterior of cylinder 4 and is clamped between suitable surfaces formed on screw sleeves 55 and 56. Sleeve 56 is screwed to sleeve 57 which is in turn screwed to main cylinder 3 so that the exterior surfaces of said sleeves form an extension of said cylinder. In the lower sleeve 55 is a split spring ring 58 freely lubricated by means of a duct 59. Sleeve 57 and preferably also sleeve 55 are formed so as to leave a passage 60 for free flow of oil to both sides of the cup leather.

The free edge of the leather 5 is yieldingly held against the exterior of main cylinder 4 by means of a solid cone ring 60' formed with an internal cone surface as shown and constantly spring pressed in a direction parallel to the axis of the device by means of a circular spring wire 61, extending entirely around the device and formed with vertical waves, the tops and bottoms of the waves engaging the recesses in the under surface of sleeve 57, and the upper surface of cone ring 60, respectively. By this arrangement the cone ring is yieldingly forced at constant pressure in a direction parallel to the direction of movement of the packing. The angle of the cone is preferably such that in case there are any inequalities in the outer surface of cylinder 4 operating to increase the diameter of the free edge of the cup leather 5 at any point in the stroke the free edge of the cup leather will not be unduly pressed upon by the cone which will be wedged upwardly by increasing radial pressure of the cup leather thereon.

Figures 2, 3:
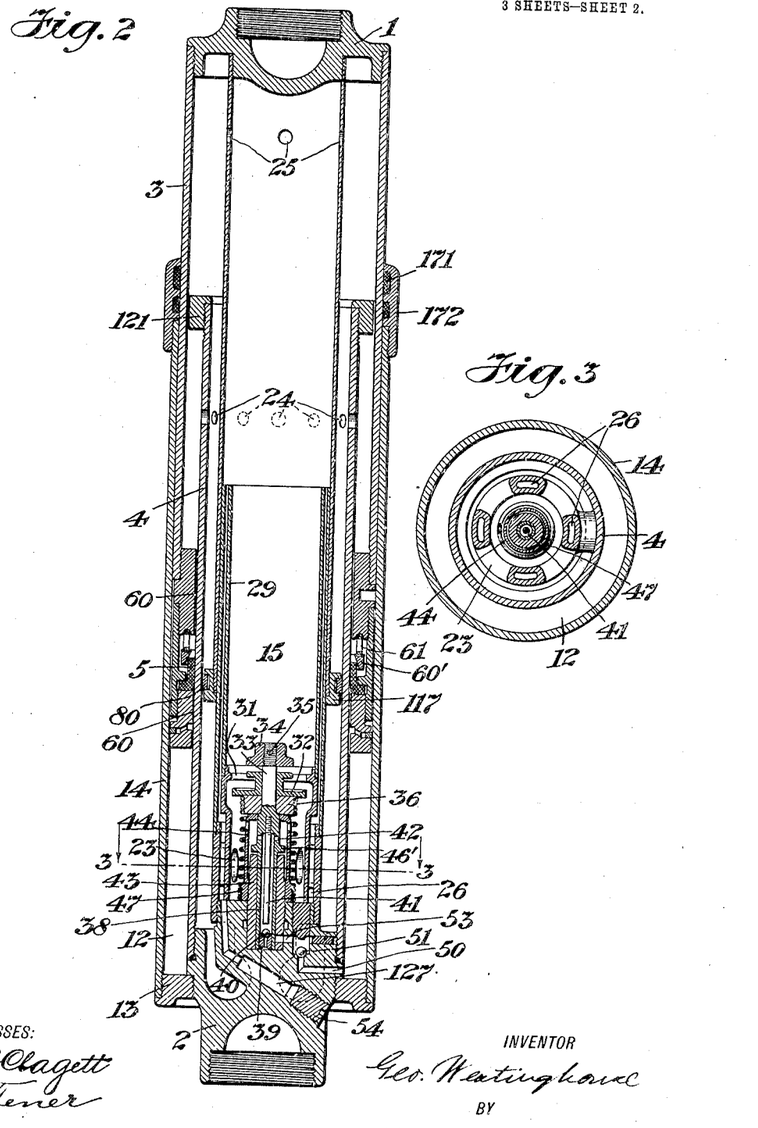
Fig. 2 is a similar view of a modified form.
Fig. 3 is a transverse section on the line 3—3 of Fig. 2.
Figures 4, 5:
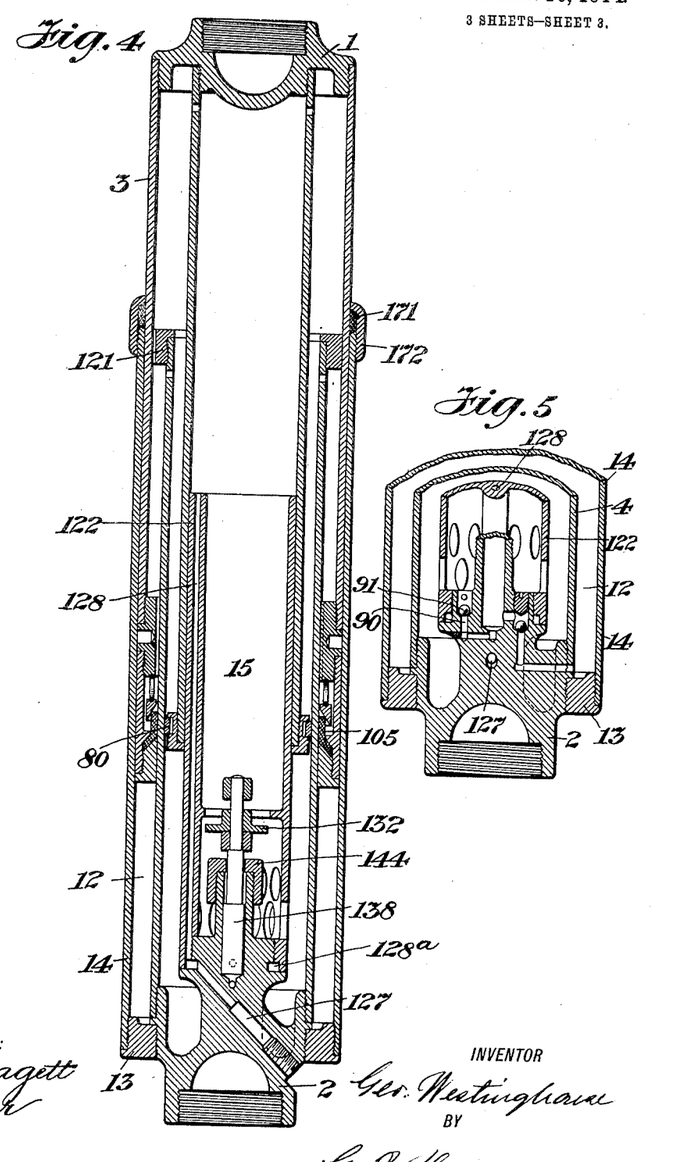
Fig. 4 is a view similar to Figs. 1 and 2, showing still another modification.
Fig. 5 is a vertical central section of the parts shown in the lower portion of Fig. 4 but taken at the plane at right-angles to the plane of said figure.

The lower supplemental cylinder 14 may be the outermost cylinder in which case it will be provided with packing and securing ring therefor, after the manner indicated in Figs. 2 and 4. But such arrangement leaves the upper portion of cylinder 3 exposed to mud and dirt and moreover the joint is upwardly exposed so that any water draining downwardly will tend to flow by gravity into the sliding joint. Hence, I prefer to arrange an upper outer guard cylinder 70 screwed to the head 1 and secured by a locking screw 73, as indicated in Fig. 1, the rubbing packing 71 of felt or similar material being held by a securing collar 72 screwed to the lower end of said cylinder 70.

The cylinder heads 1 and 2 are preferably of fine quality, dense casting free from blow holes, the cylinders are of brass, drawn and finished accurately to gage, the screw joints, particularly of the main cylinder, are preferably brazed or sweated, to prevent possibility of leaks or accidental unscrewing when in use.

Any of the three forms of the device herein shown may be taken apart by unscrewing one or more of the outer cylinders to obtain access to one of the interlocking stops that limit the expansion movement of the device, and then unscrewing one of the latter. In the arrangement shown in Fig. 1 this requires first unscrewing ring 13 from base 2, thus permitting removal of said ring together with cylinder 14. Main lower cylinder 4 may then be unscrewed to permit removal of the base 2 carrying casting 22, and cylinders 19, 29. Figs. 2 and 4 differ from Fig. 1 in that the stop 121 projects outside of main cylinder 4, and hence is adapted to contact with the top of screw sleeve 57; moreover in Figs. 1 and 2, there is no upper guard cylinder 70 so that the device may be taken apart by merely unscrewing ring 13 carrying cylinder 14 and then unscrewing sleeve 57 from main upper cylinder 3 without the necessity of disturbing the sleeves 55, 56, or the packing and spring pressed cone ring carried thereby.

In Figs. 1 and 2 the pump and manner of mounting on its base 2 are substantially the same and in both forms the pump may be reached when base 2 has been removed by unscrewing therefrom casting 22 carrying cylinders 19 and 29, whereupon the pump may be taken apart by unscrewing cage 44 thus permitting withdrawal of the pump piston. By reason of the annular form of the cavity in casting 22, the latter will be in communication with the inlet passage regardless of the circumferential position at which it happens to be when screwed tight. Valve 51 may be reached by unscrewing plug 52.

As already intimated, Figs. 2 and 4 differ from Fig. 1 in that in these there is no upper guard cylinder 70 and the wiping washer 171 is carried by guard ring 172 mounted on the upper edge of lower supplemental cylinder 14. Figs. 2 and 4 differ from Fig. 1 in the further particular that the displacing head 117 not being required to serve the function of an expansion stop, is merely an annular collar provided with a spring rubbing ring 80.

The form shown in Figs. 4 and 5 differs from that shown in any of the other figures in that the annular portion of packing 105 projects diagonally outward instead of being arranged in a radial plane transverse to the axis of the device.

The pumping arrangement shown in Fig. 4 is also different in that the piston 138 is solid and is actuated in both directions by the flow of fluid against the disk 132, the tension spring employed in the devices of Figs. 1 and 2 being omitted. The weight of the piston and its disk 132 are sufficient to cause the piston normally to seek the lowermost position shown in the drawing. The upward stroke of the pump is stopped by engagement of the upper surface of the piston with screw collar 144.

In Fig. 4, the casting 122 is a single cylinder and is formed with a single passage 128 located on one side of the cylinder. The necessity of bringing this passage into register with the charging passage 127 is obviated by forming an annular groove 128ª connecting with the lower end of passage 128 with the upper end of passage 127. This groove may be formed in the base 2 or in the cylinder 122 or, as shown in the drawing, partly in each.

In Figs. 4 and 5 the pump piston being solid a passage 90 with check valve 91 is provided for discharge of the liquid from the pump cavity into the interior of the device.

The liquid used may be mineral oil or glycerin or oil with powdered graphite or glycerin with soap or any other desired liquid mixture or compound having the desired degree of stability, lubricating quality, etc.

In preparing the device for use, the desired liquid is pumped in through the inlet passage 27, Fig. 1, the supply being continued until the oil rising through annular space 28 between the cylinders 19 and 29 overflows, and fills the main compression space 15 and, through passages 23, the space 16, preferably to a level somewhat higher than the top of cylinder 29. The surplus oil may be drawn off or blown off by internal pressure through annular space 28 until the level falls sufficiently to prevent further outflow of oil. Compressed air may then be pumped in, until the device expands sufficiently to support the desired load with the telescoping cylinders in approximately the midway position.

It will be noted that by the above described arrangement the height of the oil within the device is predetermined with reference to the bottom of the device and so long as the adjustment is made with the device in a vertical position, a fixed minimum volume of liquid and a normally constant level thereof within the device, will be insured, whereas in the arrangement shown in my prior application above referred to, the oil charging pipe and blow-off being attached to the upper cylinder head, the level of the oil is predetermined with reference to the upper cylinder head, so that the blow-off operation does not necessarily insure the presence of a definite minimum volume of oil within the device.

I claim:

1. An elastic cushion device of the hydropneumatic type comprising relatively movable members having a sliding joint to permit varying of the volume of the fluid contained therein, liquid and gaseous fluids within said device, in combination with an internal pump supported in fixed relation to the bottom of the liquid within the device and adapted to be operated by flow of fluid therein together with means for forcing the liquid to circulate in operative relation to said pump upon movement of said relatively movable members.

2. An elastic cushion device of the hydropneumatic type comprising relatively movable members having a sliding joint to permit varying of the volume of the fluid contained therein, liquid and gaseous fluids within said device, and a partition member carried by one of said movable members, arranged to subdivide the lower portion of the space within said device and affording a passage for the liquid, below the normal level thereof, from one subdivision to another, in combination with a displacing member carried by the other relatively movable member and located in one of said subdivisions so as to force the liquid to circulate through said passage upon movement of said relatively movable members.

3. An elastic cushion device of the hydropneumatic type comprising relatively movable members having a sliding joint to permit varying of the volume of the fluid contained therein, liquid and gaseous fluids within said device, and a partition member carried by one of said movable members, arranged to subdivide the lower portion of the space within said device and affording a passage for the liquid, below the normal level thereof, from one subdivision to another, in combination with a displacing member carried by the other relatively movable member and located in one of said subdivisions so as to force the liquid to circulate through said passage upon movement of said relatively movable members, together with a pump in operative relation to said passage and adapted to be operated by fluid flow therethrough, said pump having an external intake in operative relation to liquid leaking from the sliding joint and a discharge into the pressure cavity within the device.

4. An elastic cushion device of the hydropneumatic type comprising relatively movable members adapted for varying of the volume of the fluid contained therein, a fluid compression medium within said device, a passage for fluid in fixed relation to the bottom of the device and a pump in operative relation to said passage, adapted to be operated by flow of fluid therethrough, in combination with a displacing member for forcing the fluid to circulate through said passage to operate said pump upon movement of said relatively movable members.

5. An elastic cushion device of the hydropneumatic type comprising relatively movable members for varying the volume of the fluid contained therein, liquid and gaseous fluids within said device, a passage for fluid in fixed relation to the bottom of the device, motive means adapted to be operated by flow of fluid through said passage, and an agent operated by said motive means to force fluid into the compression space within said device in combination with means for forcing the fluid to circulate through said passage to operate said agent upon movement of said relatively movable members.

6. An elastic cushion device of the hydropneumatic type comprising relatively movable members having a sliding joint to permit varying of the volumetric capacity thereof, liquid and gaseous fluids within said device, a passage for fluid in fixed relation to the bottom of the liquid within the device and a pump in operative relation to said passage adapted to be operated by flow of fluid therethrough, in combination with means for forcing the liquid to circulate through said passage to operate said pump upon movement of said relatively movable members.

7. An elastic cushion device of the hydropneumatic type comprising relatively movable members having a sliding joint to permit varying of the volumetric capacity thereof, liquid and gaseous fluids within said device, in combination with an internal pump mounted upon the lower movable member below the normal level of the liquid within the device together with a displacing head for forcing the liquid to circulate in operative relation to said pump upon movement of said relatively movable members.

8. An elastic cushion device of the hydropneumatic type comprising upper and lower cylinder heads and telescoping main cylinders carried thereby and liquid and gaseous fluids within said device, a partition cylinder arranged vertically in fixed relation to one of said main cylinders, to subdivide the lower portion of the compression space into concentric compartments, and to afford passage for fluid adjacent the bottom of the compression space, and a displacing member arranged in one of said compartments and secured in fixed relation to the other main cylinder, in combination with a pump mounted upon the lower cylinder head within said partition cylinder, adapted to be operated by the flow of fluid caused by said displacing member upon expansion and compression movements of the device, said pump having an intake communicating with an external collecting space for leaking liquid and a discharge into the pressure cavity within the device.

9. An elastic cushion device of the hydropneumatic type comprising upper and lower cylinder heads, telescoping main cylinders carried thereby, liquid and gaseous fluids within said device, a vertically arranged partition cylinder carried by the lower cylinder head, arranged to subdivide the lower portion of the compression space into compartments, and formed with a passage for fluid adjacent the bottom of the compression space, and a displacing member arranged in the outer compartment and carried by the upper cylinder head, in combination with a pump mounted upon the lower cylinder head within said partition cylinder adapted to be operated by the flow of fluid through said passage, said pump having an intake communicating with an external collecting space for leaking liquid and a discharge in the pressure cavity within the device.

10. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a vertically arranged partition cylinder carried by the lower cylinder head arranged to subdivide the lower portion of the compression space into concentric compartments, and formed with a passage for fluid adjacent the bottom of the compression space, and a displacing member arranged in the outer compartment and carried by the upper cylinder head, in combination with a pump mounted upon the lower cylinder head within said partition cylinder adapted to be operated by the flow of fluid caused by said displacing means upon expansion and compression movements of the device, said pump having an intake communicating with an external collecting space for leaking liquid and a discharge in the pressure cavity within the device.

11. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a lower outer supplemental cylinder for closing in a space for drainage and collection of leaking liquid and means within said device for forcing liquid from said drainage space into the lower inner main cylinder.

12. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a lower outer supplemental cylinder for closing in a space for drainage and collection of leaking liquid and an upper outer supplemental guard cylinder with a wiping packing at the lower edge thereof.

13. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a lower outer supplemental cylinder for closing in a space for drainage and collection of leaking liquid and an upper outer supplemental guard cylinder with a wiping packing at the lower edge thereof in combination with a pump mounted upon the lower cylinder head adapted to be operated by the flow of fluid within the device upon expansion and compression movements of the device, said pump having an intake communicating with the external collecting space for leaking liquid and a discharge into the pressure cavity within the device.

14. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a lower outer supplemental cylinder for closing in a space for drainage and collection of leaking liquid, in combination with a pump mounted upon the lower cylinder head adapted to be operated by the flow of fluid within the device upon expansion and compression movements of the device, said pump having an intake communicating with the external collecting space for leaking liquid and a discharge into the pressure cavity within the device.

15. An elastic cushion device of the hydropneumatic type comprising upper and lower cylinder heads, an upper outer main cylinder, a lower inner main cylinder telescoping therein, a packing secured upon the inner side of the upper outer main cylinder and sliding upon the outer surface of the inner main cylinder, whereby leaking liquid drains directly downward by gravity and means for forcing the drained liquid into said lower inner main cylinder.

16. An elastic cushion device of the hydropneumatic type comprising upper and lower cylinder heads, an upper outer main cylinder, a lower inner main cylinder telescoping therein, a packing secured upon the inner side of the upper outer main cylinder and sliding upon the outer surface of the inner main cylinder, whereby leaking liquid drains directly downward by gravity and a lower outer supplemental cylinder carried by the lower head and having sliding engagement with the exterior of said upper outer main cylinder and means for pumping the liquid from the outer supplemental cylinder into the lower inner main cylinder.

17. An elastic cushion device of the hydropneumatic type comprising upper and lower relatively movable members having a sliding joint to permit varying of the volume of the fluid contained therein, liquid and gaseous fluids within said device, in combination with a charging inlet passage therefor carried by the lower movable member and having its internal discharge opening arranged a predetermined fixed distance above the bottom of the device and means within said device for transferring liquid from the low pressure side of said sliding joint to the high pressure side.

18. An elastic cushion device of the hydropneumatic type comprising upper and lower main cylinders and cylinder heads having a sliding joint, liquid and gaseous fluids within said device, and a pair of internal vertically arranged concentric cylinders carried by the lower cylinder head and a charging and blowoff passage for the fluid, formed in said lower cylinder head and communicating with the space between said concentric cylinders.

19. An elastic cushion device of the hydropneumatic type comprising upper and lower cylinder heads, an upper outer main cylinder, a lower inner main cylinder telescoping therein, a packing for the sliding joint between them, liquid and gaseous fluids in said device, a lower outer supplemental cylinder for closing in a space for drainage and collection of leaking liquid, a vertically arranged partition cylinder carried by the lower cylinder head arranged to subdivide the lower portion of the compression space into concentric compartments, and formed with a passage for fluid adjacent the bottom of the compression space, and a displacing member arranged in the outer compartment and carried by the upper cylinder head, in combination with a pump mounted upon the lower cylinder head within said partition cylinder adapted to be operated by the flow of fluid caused by said displacing means upon expansion and compression movements of the device, said pump having an intake communicating with the external collecting space for leaking liquid and a discharge in the pressure cavity within the device.

20. An elastic cushion device of the hydro-pneumatic type comprising upper and lower cylinder heads, an upper outer main cylinder, a lower inner main cylinder telescoping therein, a packing secured upon the inner side of the upper outer main cylinder and sliding upon the outer surface of the inner main cylinder, whereby leaking liquid drains directly downward by gravity, the main upper cylinder having an internal diameter materially greater than the external diameter of said lower cylinder so as to afford an annular collecting and storage space for liquid adjacent the upper side of the packing, and means connecting with the space below the packing for forcing the liquid therefrom to the lower inner main cylinder.

21. An elastic cushion device of the hydro-pneumatic type comprising upper and lower cylinder heads, an upper outer main cylinder, a lower inner main cylinder telescoping therein, a packing secured upon the inner side of the upper outer main cylinder and sliding upon the outer surface of the inner main cylinder, whereby leaking liquid drains directly downward by gravity, the main upper cylinder having an internal diameter materially greater than the external diameter of said lower cylinder so as to afford an annular collecting and storage space for liquid adjacent the upper side of the packing, in combination with an internal displacing member for causing flow of liquid into said annular space.

22. An elastic cushion device of the hydro-pneumatic type comprising relatively movable members having a sliding joint to permit varying of the volume of the fluid contained therein, liquid and gaseous fluids within said device, in combination with an internal pump supported in fixed relation to the bottom of the liquid within the device and adapted to be operated by flow of fluid therein together with means for forcing the liquid to circulate in operative relation to said pump upon movement of said relatively movable members, said parts being coördinated and arranged so that flow of liquid upon compression movements causes a suction stroke of the pump while reverse flow upon the expansion movements causes the expelling stroke of the pump.

23. An air spring comprising telescoping cylinders forming a cushion chamber having a sliding joint, packing for said joint, a lower outer cylinder serving as a guard and also for closing in a collecting space for liquid passing said packing, and means within said device for transferring liquid from said space to said chamber.

24. An air spring comprising telescoping cylinders forming a cushion chamber having a sliding joint, a packing for said sliding joint, a lower outer cylinder serving as a guard and also for closing in a collecting space for liquid leaking through said joint, and a pump within said device having its inlet connecting with said collecting space and its outlet within said chamber.

25. An air spring comprising telescoping cylinders forming a closed chamber having a sliding joint, a cupped packing for said joint, a liquid retaining space above said packing, a lower outer cylinder serving as a guard and also for closing in a collecting space below said packing for liquid leaking past the same, and a pump having its inlet connected with said collecting space and its outlet within said chamber and its operation dependent upon the relative movement of said telescopic cylinders for transferring leaked liquid from said collecting space to said chamber.

26. An air cushion device comprising telescopically arranged main cylinders the upper being the outer, forming a closed chamber, a cup packing for the sliding joint between said cylinders, the free edge of said packing extending upward, a reservoir for sealing liquid above said packing, an outer supplemental or guard cylinder surrounding the lower of said main cylinders and serving as a collecting chamber for the liquid escaping from said reservoir past said packing and means within the device for returning the escaped liquid to said reservoir.

27. An air cushion device comprising telescopically arranged main cylinders, the upper being the outer, a cup packing for the sliding joint between said cylinders, a reservoir for sealing liquid above said packing, an outer supplemental or guard cylinder surrounding the lower main cylinder and serving as a collecting chamber for the liquid escaping from said reservoir through said packing, and means within the device and having an inlet opening through the side of the lower main cylinder for returning the escaped liquid to said reservoir.

28. An air cushion device comprising telescopically arranged main cylinders, the upper being the outer, a packing for the sliding joint between said cylinders, a reservoir for sealing liquid above said packing, an outer supplemental or guard cylinder surrounding the lower main cylinder and serving as a collecting chamber for the liquid escaping from said reservoir past said packing, and means within the device and having an inlet opening leading through the side of the lower main cylinder to said collecting chamber for returning the escaped liquid to the device.

29. An air cushion device comprising members having a sliding joint therebetween and arranged to form a cushion chamber, a packing for the sliding joint between said members, a reservoir for sealing liquid above said packing, an outer guard cylinder serving as a collecting chamber below said packing for the liquid escaping from said reservoir past said packing, and means within the device for returning the liquid from said collecting chamber to said reservoir.

30. An air cushion device comprising telescopically arranged main cylinders, the upper being the outer, a cup packing for the sliding joint between said cylinders, the free edge of said packing extending upward, a reservoir for sealing liquid above said packing, an outer supplemental or guard cylinder surrounding the lower of said main cylinders and serving as a collecting chamber for the liquid escaping from said reservoir past said packing, and a pump within the device operating upon the relative movement of said main cylinders and having an inlet opening through the side of the lower main cylinder for returning the escaped liquid from said collecting chamber to the device.

31. An air-spring comprising telescoping cylinders forming a cushion chamber having a sliding joint, packing for said joint, the bottom of said chamber forming a receptacle for a supply of liquid fluid, means for maintaining a liquid seal for said packing, an overflow gage pipe extending upwardly into said chamber from the bottom thereof, and removable means for closing the lower end of said pipe, for the purpose set forth.

32. An air-spring device comprising telescoping cylinders forming a cushion chamber having a sliding joint, packing for said joint, a lower outer cylinder serving as a guard and also for closing in a collecting space for liquid passing through said joint, means for supplying a liquid seal for said joint, means for transferring liquid from said collecting space into said chamber, and an overflow gage pipe extending upwardly into said chamber from the bottom thereof and provided with a removable plug for the lower end thereof.

33. An air-spring comprising relatively movable members having a sliding joint therebetween and forming a closed cushion chamber, a packing for said joint, the top of which is subjected to the higher pressure, and a supplemental chamber in connection with said cushion chamber and forming a reservoir above said packing for maintaining a body of sealing liquid in contact with said packing on its high pressure side.

34. An air-spring comprising relatively movable members having a sliding joint therebetween and forming a closed cushion chamber, a packing for said joint, the top of which is subjected to the higher pressure, and a supplemental annular chamber in connection with said cushion chamber and forming a reservoir above said packing for supplying the same with sealing liquid on its high pressure side.

35. An air spring comprising relatively movable members having a sliding joint therebetween and forming a closed cushion chamber, a cup leather packing for said joint having its free edge extending upwardly, a conical expander for said free edge and a supplemental chamber in connection with said cushion chamber forming a reservoir above said packing for maintaining a body of sealing liquid in contact with the free edge of said packing.

36. An air spring comprising telescopically arranged cylinders having a sliding joint therebetween and forming a closed chamber, a cup leather packing for said joint the free edge of which extends upwardly and parallel with one of said cylinders, a conical expander for forcing said free edge in contact with said cylinder, an annular oil reservoir above said packing, and means for supplying said reservoir with sealing liquid.

37. An air spring comprising telescopic cylinders having a sliding joint therebetween and forming a closed cushion chamber, a packing for said joint, the top of which is subjected to the higher pressure, and a supplemental annular chamber in connection with said cushion chamber and forming a reservoir above said packing for maintaining a body of sealing liquid in contact with the high pressure side of said packing.

38. An air spring comprising relatively movable members having a sliding joint therebetween and forming a closed cushion chamber, a packing for said joint, an annular reservoir above said packing on the high pressure side thereof for maintaining a body of sealing liquid in contact with said packing, sealing liquid within said cushion chamber, and means for transferring sealing liquid from said cushion chamber to said reservoir.

39. An air spring comprising relatively movable members having a sliding joint therebetween and forming a closed cushion chamber, a packing for said joint, an annular reservoir above said packing on the high pressure side thereof for maintaining a body of sealing liquid in contact with said packing, sealing liquid within said cushion chamber, means for transferring sealing liquid from said cushion chamber to said reservoir, and an overflow gage pipe extending upwardly into said cushion chamber from the bottom thereof.

40. An air spring comprising relatively movable members having a sliding joint therebetween and forming a closed cushion chamber, a packing for said joint, an annular reservoir above said packing on the high pressure side thereof for maintaining a body of sealing liquid in contact with said packing, sealing liquid within said cushion chamber, means for transferring sealing liquid from said cushion chamber to said reservoir, an overflow gage pipe extending upwardly into said cushion chamber from the bottom thereof, and removable means for closing the lower end of said pipe.

41. An air spring comprising telescoping cylinders forming a cushion chamber having a sliding joint, the bottom of said chamber forming a receptacle for a supply of sealing liquid, a packing for said joint, a reservoir segregated from said cushion chamber above said packing on its high pressure side and in communication therewith, and means for transferring liquid from said cushion chamber to said reservoir.

Signed at East Pittsburgh, in the county of Allegheny, and State of Pennsylvania, this ninth day of September, A. D. 1910.

GEO. WESTINGHOUSE.

Witnesses:
H. C. TENER,
GEO. J. TAYLOR.